United States Patent [19]

Sagoi et al.

[11] Patent Number: 4,761,334
[45] Date of Patent: Aug. 2, 1988

[54] MAGNETIC RECORDING MEDIUM

[75] Inventors: Masayuki Sagoi, Kanagawa; Noritsugu Kawashima, Tokyo; Yoichiro Tanaka; Kunio Sekine, both of Kanagawa, all of Japan

[73] Assignee: Kabushiki Kaisha Toshiba, Kawasaki, Japan

[21] Appl. No.: 750,271

[22] Filed: Jul. 1, 1985

[30] Foreign Application Priority Data

Sep. 21, 1984 [JP] Japan .................................. 59-197917
Sep. 21, 1984 [JP] Japan .................................. 59-197918
Sep. 21, 1984 [JP] Japan .................................. 59-197919

[51] Int. Cl.⁴ .............................................. G11B 5/64
[52] U.S. Cl. ................................... 428/332; 427/131; 428/694; 428/695; 428/698; 428/900
[58] Field of Search ............... 428/694, 695, 900, 332, 428/698; 427/131

[56] References Cited

U.S. PATENT DOCUMENTS 4,187,344  2/1980  Fredriksson .................. 428/698
4,529,659  7/1985  Hoshino et al. ............... 427/131
4,565,734  1/1986  Arai et al. ..................... 428/695

FOREIGN PATENT DOCUMENTS 113416  7/1982  Japan ................... 428/694

Primary Examiner—Paul J. Thibodeau
Attorney, Agent, or Firm—Cushman, Darby & Cushman

[57] ABSTRACT

A magnetic recording medium in which a silicon nitride film is formed on a magnetic recording layer having an axis of easy magnetization in the direction essentially perpendicular to its own layer surface. The magnetic recording layer is a metallic magnetic film such as a Co-Cr containing alloy. The silicon nitride film is preferably in a state in which the number of nitrogen atoms is less than four thirds of the number of silicon atoms. A lubricant layer such as a layer of fluorocarbon can be formed on the silicon nitride film.

22 Claims, 2 Drawing Sheets ly to the layer surface thereof.

MAGNETIC RECORDING MEDIUM

BACKGROUND OF THE INVENTION

This invention relates to a magnetic recording medium, and more particularly to a perpendicular magnetic recording medium which includes a magnetic recording layer having an axis of easy magnetization in the direction essentially perpendicular to layer surface thereof.

With recent advances in information processing, the quantity of information written onto and read from memory devices has been increasing rapidly. The demand for increased capacity for magnetic recording media such as floppy disks has also been increasing.

In order to respond to such a demand, active research and development have been pursued on magnetic recording media with high density capability, in particular on perpendicular recording media which realize magnetic data storage by establishing residual magnetism in the direction essentially perpendicular to the layer surface. The magnetic recording medium for perpendicular magnetic recording a magnetic recording layer has an axis of easy magnetization in the direction essentially perpendicular to the surface thereof. As such a magnetic recording layer, there is known a metallic film medium formed by sputtering or vapor deposition of a metallic film such as a Co-Cr system alloy or the like, or an oxide film medium with the magnetoplumbite crystal structure such as Ba ferrite or Sr ferrite. Such a perpendicular magnetic recording medium is considered to be promising as a medium better suited for high density recording than a particular medium which is employed for the majority of the longitudinal magnetic recording media.

In a particular medium, the magnetic recording medium is formed by coating a base (substrate) with a magnetic powder mixed with a binder or the like. The magnetic recording layer thus formed is elastic. In addition, it is possible to mix a lubricant in the magnetic layer. This helps to maintain an intimate contact between the magnetic medium and a magnetic head for writing on/reading from the magnetic medium, making it possible to give a sufficient durability to the medium and the head.

In contrast to this, a magnetic recording layer of the metallic film medium or the oxide film medium has little elasticity. When a magnetic head made of a hard material such as ferrite runs on a magnetic medium, damages like scratches tend to be created on the surface of the medium or the head. In that case, not only is the durability of the medium and the head reduced, but also the effective spacing between the medium and the head is increased due to adherence of the powder abraded from the medium or the head. This results in an increase in what is known as "spacing loss" which becomes the cause of degradation in the frequency characteristic and a lowering of the variations in the reproduced output level.

For this reason, it is considered, in the case of the metallic film and the oxide film medium, to form a protective layer made of a hard material over the magnetic recording medium to protect it. As a concrete example of the protective layer, there has been proposed a film of silicon oxide, aluminum oxide, titanium nitride, and others. However, the quality of material of such a protective layer is brittle so that it tends to be worn out by its contact with the magnetic head. Then, the resulting worn powder damages the medium and the head, showing that it will not be sufficient as a solution to the above problem.

In this case, forming a protective layer thick enough may be considered to be effective for preventing the abrasion of the magnetic recording layer. However, it is not desirable from the viewpoint of the perpendicular magnetic recording characteristic. Namely, the recording density of the perpendicular magnetic recording system is essentially much higher than that of the longitudinal magnetic recording system, and the recording wavelength may be reduced. It becomes necessary to restrict the effective spacing between the head and the medium to an extremely small value, and accordingly, the thickness of the protective layer is limited also. When the thickness of the protective layer is restricted in this way to the extent that it does not injure the perpendicular magnetic recording characteristic, the durability improvement is inadequate.

As an alternative there may be considered a method of coating a lubricant over the magnetic recording layer. However, in the case of a metallic film type medium, the film formed by sputtering or a like method has such a smooth surface that the wetting and holding power for a lubricant are low. Therefore, it is difficult to spread a lubricant over the layer with sufficient adhesive power and uniformity so that the above problems still remains unsolved.

SUMMARY OF THE INVENTION

An object of the present invention is to provide a magnetic recording medium which is capable of remarkably improving the durability of a medium itself and a magnetic head that runs by making contact with the medium.

Another object of the present invention is to provide a magnetic recording medium which is capable of reducing the spacing loss between the magnetic recording medium and the magnetic head, and by means of that, improving the frequency characteristic as well as improving remarkably the perpendicular magnetic recording characteristic, such as reducing the lowering and the variations in the output power during the reproducing.

According to a preferred embodiment of the present invention, the magnetic recording medium includes, on a nonmagnetic base, a magnetic recording layer with an axis of easy magnetization in the direction essentially perpendicular to its own layer surface, and over the layer there is formed a film of silicon nitride as a protective layer. In the silicon nitride layer, it is desirable to have the number of constituent nitrogen atoms to be less than the four thirds of the number of silicon atoms. In addition, it is desirable to form a lubricant layer, such as a layer of fluorocarbon, over the silicon nitride layer.

BRIEF DESCRIPTION OF THE DRAWINGS

These and other objects and advantages of this invention will become more apparent and more readily appreciated from the following detailed description of the presently preferred exemplary embodiments of the invention with reference to the accompanying drawings, in which.

DETAILED DESCRIPTION OF THE PREFERRED EMBODIMENTS

Figure 1:
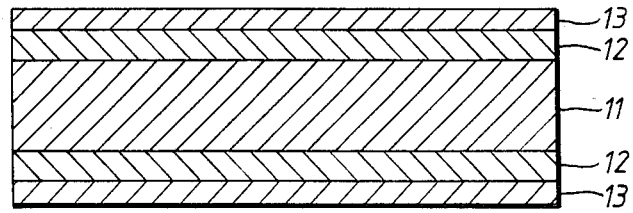
FIG. 1 illustrates an embodiment of the magnetic recording medium in accordance with the present invention which includes a magnetic recording layer with an axis of easy magnetization in the direction perpendicular to the layer surface as well as a silicon nitride film over the recording layer as a protective layer.

Referring to FIG. 1, a base 11 is a film-like nonmagnetic base made of resin, and there is formed on the base (substrate) 11 a Co-Cr system alloy film 12 with a thickness of 0.5 μm by means of dc magnetron sputtering. The Co-Cr system alloy film 12 is arranged to possess an axis of easy magnetization in the direction perpendicular to the film surface. That is, the Co-Cr system alloy film 12 has a perpendicular magnetic anisotropy. On the Co-Cr system alloy layer 12, there is formed a silicon nitride film 13 with thickness between 20 Å and 500 Å, more preferably between 50 Å and 400 Å, as a protective layer.

The silicon nitride film 13 is formed by means of high frequency sputtering with silicon nitride target or reactive sputtering with silicon target.

The silicon nitride film 13 thus formed is very hard with a Vickers hardness of about 2200 kg/mm$^2$ so that it is possible to reliably protect the magnetic recording layer from injuries caused by its contact with the magnetic head. Moreover, silicon nitride has a superior abrasion-resistance compared with silicon oxide ($SiO_2$), aluminum oxide ($Al_2O_3$), or titanium nitride (TiN), that is, it is less brittle. Therefore, even under a continuous running of the magnetic head over the silicon nitride film, the amount of powder generated by abrasion is very small, reducing the abrasion and damage to the medium itself and the head to a marked extent. In addition, silicon nitride film has an extremely fine material quality and can isolate the magnetic recording layer from the surrounding atmosphere so that it has an effect of improving remarkably the corrosion resistance of the recording medium. Then, from the features that silicon nitride film has a good abrasion resistance and a corrosion resistance as described above, it becomes possible to improve the durability of the medium and the magnetic head even if its thickness is relatively small. Therefore, the amount of abraded powder that generated is small, as was mentioned earlier. Thus, together with a smaller increase, caused by abraded powder, in the effective spacing between the medium and the head, it becomes possible to reduce the spacing loss between the medium and the head. This makes it possible to enhance markedly the perpendicular magnetic recording characteristic of the recording layer by improving the frequency characteristic as well as by reducing the lowering and the variations in the output power during the reproducing. Namely, it becomes possible to provide a magnetic recording medium which can satisfy simultaneously both of the durability and the perpendicular magnetic recording characteristic.

Table 1 shows the results of experiment on the durability of magnetic recording medium with various kinds of protective layers formed on a Co-Cr system alloy film by high frequency sputtering. Here, the experiment was carried out by forming the magnetic recording medium with the above composition into the shape of a floppy disk, and by contacting a ferrite magnetic head at the same track on the disk, as well as holding down the magnetic head onto the disk by means of a pad, while rotating the disk is turned at a speed of 300 rotations per minute. The load on the pad was 15 grams. The durability is defined here as the number of rotations (passes) of the disk before either of the medium (disk) or the head suffers any conspicuous damage. What is meant by conspicuous damage, in the case of the medium, is a state in which the surface of the base 11 is exposed through scraping of at least a portion of the silicon nitride film 13 and the Co-Cr system alloy film 12.

TABLE 1

|   | Protective Layer | (Film) Thickness of Protective Layer (Å) | Power for Sputtering (W) | Ar Pressure (M Torr) | Durability Number of Pass |
|---|---|---|---|---|---|
| 1 | $Si_3N_4$ | 60 | 70 | 20 | $17 \times 10^4$ |
| 2 | $Si_3N_4$ | 100 | 100 | 20 | $30 \times 10^4$ |
| 3 | $Si_3N_4$ | 200 | 100 | 15 | $37 \times 10^4$ |
| 4 | $Si_3N_4$ | 400 | 100 | 20 | $42 \times 10^4$ |
| 1 | $Al_2O_3$ | 150 | 50 | 10 | $8 \times 10^4$ |
| 2 | $Al_2O_3$ | 300 | 100 | 10 | $6 \times 10^4$ |
| 3 | WC | 200 | 100 | 20 | $3 \times 10^4$ |
| 4 | BN | 170 | 150 | 20 | $0.3 \times 10^4$ |
| 5 | TiN | 200 | 100 | 30 | $0.3 \times 10^4$ |

As is clear from Table 1, the protective layers made of silicon nitride film in accordance with the present invention show a marked improvement in the durability at smaller film thicknesses, in comparison to the films of aluminum oxide, tungsten carbide, boron nitride, titanium nitride, and others, that have been proposed in the past as protective layers.

Moreover, because the magnetic recording layer in the above embodiment is a film of a Co-Cr system alloy film 12, in particular, it has the following advantage. Namely, as a disclosed example of a magnetic recording medium which utilizes the silicon nitride film as a protective layer, there exists the following literature: "$Si_3N_4$ Protective Film for Plating Type Magnetic Disk Produced by RF Sputtering Method", Abstracts of Papers for the 4th Meeting of Applied Magnetic Society of Japan (November 1980). This disclosed literature, judging from the technical background of the time in which it was published, seems to have as its object the hard disk of the longitudinal magnetic recording system which employs Co-Ni-P film as the magnetic recording layer. According to the content of the paper, there is described the necessity of having a sputtered Cr film of thickness 0.01 μm as an intermediate layer to ensure the adhesion of an $Si_3N_4$ film. However, having an intermediate layer between the magnetic recording layer and the $Si_3N_4$ layer results in an increase in the effective spacing between the medium and the head by the amount corresponding to the thickness of the intermediate film, giving rise to a hindrance to the high density recording, presenting a serious problem to the perpendicular magnetic recording in particular.

In contrast to the above, when the magnetic recording layer is a Co-Cr system alloy film 12 and the construction is such as to have silicon nitride film 13 on the film 12, as in the above embodiment of the present invention, the Cr component in the Co-Cr system alloy film 12 contributes to improve the adhesion of the silicon nitride film 13, so that it becomes possible to obtain a satisfactory adhesion of the silicon nitride film 13 without the intervention of an intermediate layer. Therefore, along with the fact that the film thickness of the silicon nitride film 13 itself can be made small, as mentioned earlier, it becomes possible to reduce the effective spacing between the medium and the head in a more efficient manner. This leads to a very small spacing loss in the perpendicular magnetic recording, giving rise to an advantage in that it becomes possible to obtain satisfactory recording and reproducing characteristics.

For double-sided disks, a second Co-Cr layer 12 and a second silicon nitride film 13 can be added to a second surface of base 11.

Figure 2:
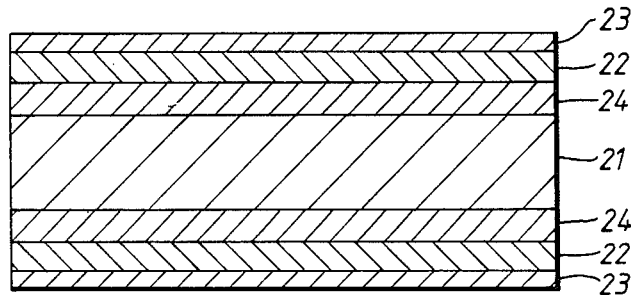
FIG. 2 illustrates another embodiment of the magnetic recording medium in accordance with the present invention which includes a soft ferromagnetic layer beneath the magnetic recording layer with an axis of easy magnetization in the perpendicular direction.

FIG. 2 illustrates another embodiment of the magnetic recording medium in accordance with the present invention. A soft ferromagnetic layer 24 and a Co-Cr system alloy film 22, as a magnetic recording layer, are formed on a nonmagnetic base 21, stacked one on top of another, by vapor deposition method, and a silicon nitride film 23 is formed on top of all as a protective layer by sputtering. As the soft ferromagnetic layer 24, use may be made, for example, of a permalloy film, a Co-Zr system alloy film, a sendast alloy film, or the like.

For double-sided disks, second layers of soft ferromagnetic material 24, Co-Cr film 22 and silicon nitride 23 can be added to a second surface of base 21.

In a magnetic recording medium with such a construction, there can also be obtained excellent perpendicular magnetic recording characteristics and a high durability that are similar to the magnetic recording medium explained for the preceding embodiment.

Figure 3:
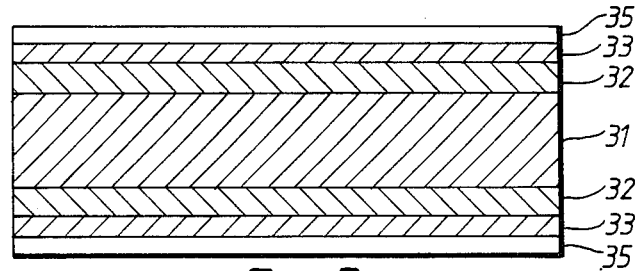
FIGS. 3 and 4 illustrate still further embodiments of the magnetic recording medium in accordance with the present invention which includes a liquid and solid lubricant layers, respectively, over the silicon nitride layer.

FIG. 3 shows still another embodiment of the present invention. In this embodiment of the magnetic recording medium, there are formed a Co-Cr system alloy film 32 and a silicon nitride film 33 in succession on a nonmagnetic base layer 31, and there is formed by coating a liquid lubricant layer, preferably of fluorocarbon system, over the silicon nitride film 33, as a lubricant layer 35. The total-thickness of the silicon nitride film 33 and the film of the lubricant layer 35 is between 20 Å and 500 Å, preferably between 50 Å and 400 Å. However, considering both of the durability and the magnetic recording and reproducing characteristics of the magnetic recording medium, it is more desirable to have a silicon nitride film of thickness between 150 Å and 250 Å and a lubricant layer of thickness between about 30 Å and 50 Å. Preferably, these layers should be between 50 Å and 400 Å.

The silicon nitride film 33 is formed, for example, by high frequency sputtering with a silicon nitride target. In that case, sputtering is carried out by first pumping the vacuum chamber for sputtering to about $10^{-7}$ Torr to remove impurity gases thoroughly, and then introducing argon gas to about $10^{-2}$ Torr.

The silicon nitride film 33 thus formed has a satisfactory affinity and an adhesion with the Co-Cr system alloy film 32, and moreover, it has excellent wetting and holding capabilities of the lubricant layer 35 of fluorocarbon system lubricant, such that it becomes possible to coat a lubricant layer 35 uniformly with a sufficiently small thickness to the extent it does not injure the perpendicular magnetic recording characteristic. In addition, a sufficient bonding force between the silicon nitride layer 33 and the lubricant layer 35 is also obtainable.

Therefore, the above construction make a substantial contribution toward the improvement of the durability of the magnetic recording medium itself as well as the magnetic head which runs by making contact with the medium. Since in this case the attachment of the abraded powder to the medium and the head is small and the film thicknesses of the silicon nitride film 33 and the lubricant layer 35 can be made relatively small, it becomes possible to control the effective spacing between the medium and the head to a small value. In this way, the spacing loss can be made small which leads to obtaining a satisfactory frequency characteristic and to a reduction in the lowering and variations in the output power during the reproducing, making it possible to obtain a good perpendicular magnetic recording characteristic.

Table 2 shows the results of experiment on the relationship between the durability and the various combinations of the materials for the protective layers and the lubricant layers to be formed over the Co-Cr system alloy film. Here, the experiment was carried out by forming the magnetic recording medium with the above composition in the shape of a floppy disk, and contacting a ferrite magnetic head at the same track on the disk while it is being turned at the speed of 300 rotations per minute. The load of the pad used was 15 gram.

TABLE 2

| | Protective Layer | Protective Layer Thickness (Å) | Lubricant | Lubricant Layer Thickness (Å) | Durability Number of Pass |
|---|---|---|---|---|---|
| 1 | $Si_3N_4$ | 200 | Fluorocarbon system | 30 | $45 \times 10^4$ |
| 2 | $Si_3N_4$ | 190 | Fluorocarbon system | 100 | $110 \times 10^4$ |
| 3 | $Si_3N_4$ | 190 | Fluorocarbon system | 250 | $125 \times 10^4$ |
| 4 | $Si_3N_4$ | 210 | Butyl stearate | 150 | $38 \times 10^4$ |
| 1 | $Al_2O_3$ | 170 | Fluorocarbon system | 100 | $26 \times 10^4$ |
| 2 | $Al_2O_3$ | 210 | Butyl stearate | 150 | $1.4 \times 10^4$ |
| 3 | $Al_2O_3$ | 200 | Oleic acid | 180 | $0.7 \times 10^4$ |
| 4 | WC | 200 | Fluorocarbon system | 110 | $11 \times 10^4$ |
| 5 | WC | 220 | Butyl stearate | 170 | $0.9 \times 10^4$ |
| 6 | WC | 230 | Oleic acid | 150 | $0.5 \times 10^4$ |
| 7 | WC | 210 | None | — | $0.4 \times 10^4$ |

As may be seen from Table 2, it is clear in the magnetic recording media according to the present invention in which a lubricant layer of fluorocarbon system is formed on the silicon film, that their durability is improved markedly compared with the prior art magnetic recording media in which a protective layer such as aluminum oxide or tungsten carbide is used or with the magnetic recording media shown in FIG. 1 in which there is formed a silicon nitride film alone, though the thickness of the silicon nitride film and the lubricant layer that act as protective layers are made small so as to be suitable for perpendicular magnetic recording.

For double-sided disks, second layers of Co-Cr 32, silicon nitride 33 and lubricant 35 can be added to a second surface of base 31.

Figure 4:
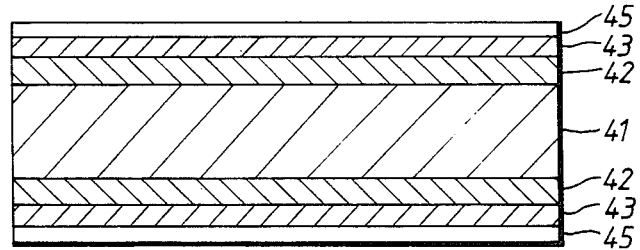

FIG. 4 illustrates another embodiment of the magnetic recording medium in accordance with the present invention. It is constructed in a manner in which a Co-Cr system alloy film 42 is formed on a nonmagnetic base 41 as the magnetic recording layer by vapor deposition, a silicon nitride film 43 is formed on top of it by, for example, magnetron sputtering, and further a solid lubricant layer, preferably of a lubricant of fluorocarbon system, is formed by sputtering on top of the whole thing. The silicon nitride film 43 is formed, for example, in an argon atmosphere in which the partial pressure of nitrogen gas is about 10% of the partial pressure for argon gas.

In a magnetic recording medium formed in this manner, an excellent durability as described in the preceding embodiments can also be obtained.

Figure 5:
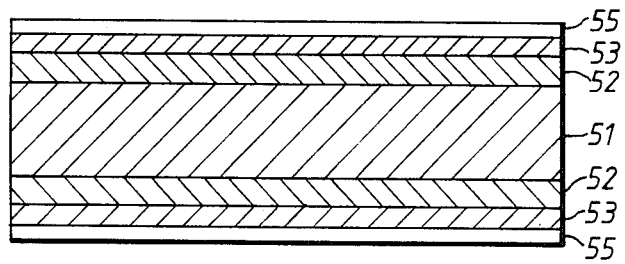
FIG. 5 illustrates still another embodiment of the magnetic recording medium in accordance with the present invention which includes a silicon nitride film whose number of nitron atoms is less than four thirds of the numbers of silicon atoms.

A magnetic recording medium shown in FIG. 5 is constructed by forming a Co-Cr system alloy film 52, a silicon nitride film 53, and a lubricant film 55 in succession over a nonmagnetic base 51, and has a special feature in that the silicon nitride film is in a state of deficit in nitrogen. A silicon nitride film 53 which is in such a state of deficit in nitrogen is formed by, after pumping in advance the vacuum chamber for sputtering to about $10^{-7}$ Torr to remove thoroughly impurity gases, introducing nitrogen gas to a level below than for the formation of ordinary silicon nitride ($Si_3N_4$), namely, to about $10^{-7}$ to $10^{-2}$ Torr, and then introducing argon gas to bring the total pressure to about $10^{-2}$ Torr. A silicon nitride film formed in this manner is in a state of deficit in nitrogen with a composition formula given by $Si_3N_{4-x}$. In this case, the value for x may be controlled to an arbitrary value in the range between 0 and 4 by varying the partial pressure of nitrogen in the atmosphere for sputtering and the speed of film formation. Here, the value of x may be determined, for example, by forming a film of $Si_3N_{4-x}$ to a thickness of about 1 $\mu$m on an LiF crystal and analyzing the film by means of XMA (X-ray microanalyzer).

Since a silicon nitride film 53 thus formed is in an actuated state due to deficit in nitrogen, it enables to have a uniform spread of a lubricant in forming a lubricant layer 55 by spreading a liquid lubricant on the film 53. Furthermore, the bonding between the silicon nitride film 53 and the lubricant layer 55 can also be increased. Therefore, it contributes greatly to the improvement of durability of the magnetic recording medium and the magnetic head.

For double-sided disks, second layers of Co-Cr 52, silicon nitride 53 and lubricant 55 can be added to a second surface of base 51.

Table 3 shows the results of experiment on the variations in the durability for the cases where the value of x is varied by changing the partial pressure ratio of nitrogen in the atmosphere for sputtering and the speed of film formation. Here, the experiment was carried out by the magnetic recording media, which was constructed by sprading a lubricant of fluorocarbon system to a thickness of about 30 Å over a silicon nitride film with approximate thickness of 200 Å, into the shape of a floppy disk, and contacting a ferrite magnetic head to the same track on the disk which is being turned at a speed of 300 rotations per minute. The load of the pad used was 15 gram.

TABLE 3

| Range of x | Sputtering Atmosphere Ratio of Partial of Nitrogen (%) | Speed of Film Formation (Å/min) | Durability Number of Pass |
|---|---|---|---|
| 0 | 50 | 18 | $40 \times 10^4$ |
| ~0.01 | 20 | 130 | $250 \times 10^4$ |
| ~0.08 | 10 | 70 | $500 \times 10^4$ |
| ~0.6 | 10 | 190 | $450 \times 10^4$ |
| ~0.9 | 5 | 110 | $275 \times 10^4$ |
| ~1.4 | 0 | 210 | $100 \times 10^4$ |
| ~2 | 0 | 350 | $40 \times 10^4$ |

Figure 6:
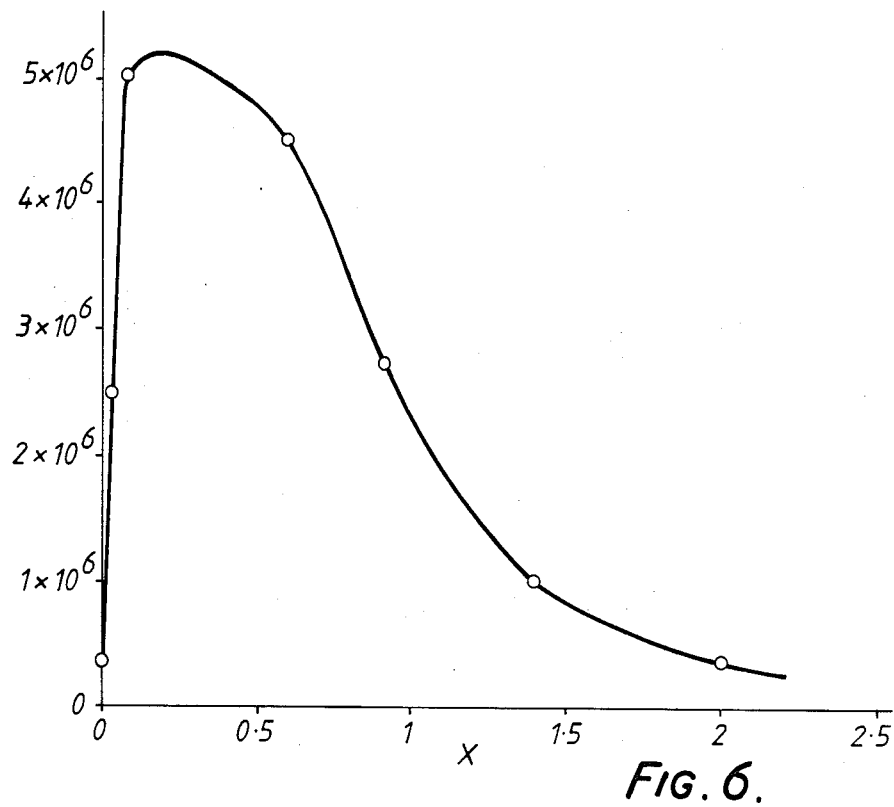
FIG. 6 illustrates the relationship between the value of x in the silicon nitride film ($Si_3N_{4-x}$) and the durability of the magnetic recording medium for the embodiment shown in FIG. 5.

In addition, the relationship between the durability thus found and the value of x is shown in FIG. 6.

From the above result, it can be seen that the durability is improved conspicuously when the number of nitrogen atoms constituting the silicon nitride film 53 is less than four thirds of the number of silicon atoms. In particular, the range of $0.01 < x < 1.4$ is suited over which the durability is more than 1 million passes, which is in excess of six times compared with the cases for the value of x which is below zero, with a maximum value of exceeding 5 million passes indeed.

The fall from the peak of the durability for the value of above 2 is due, while the adhesion of the lubricant layer 55 is improved for a state of nitrogen deficiency, to the decrease in the hardness of the silicon nitride film 53 itself. However, the fall of the durability to a level below that for the value zero of x occurs, as may be inferred from the results of experiment in the above, when the value of x increases to a large value, for example, close to three. Then, the silicon nitride film 53 loses the properties as silicon nitride and approaches a film of silicon, so that the use of the name of silicon nitride itself for such a state will become unwarranted.

In this manner, according to the present invention, it is possible to improve conspicuously the durability of the magnetic recording medium itself and the magnetic head by arranging the silicon nitride film to be in a state of nitrogen deficiency in which the number of nitrogen atoms is less than four thirds of the number of silicon atoms in order to increase the adhesion of the lubricant layer that is formed on the silicon nitride film. It is possible then to decrease the failure rate by reducing the lowering and the variations in the output power during the reproducing, through formation of the lubricant layer in a uniform manner.

Figure 7:
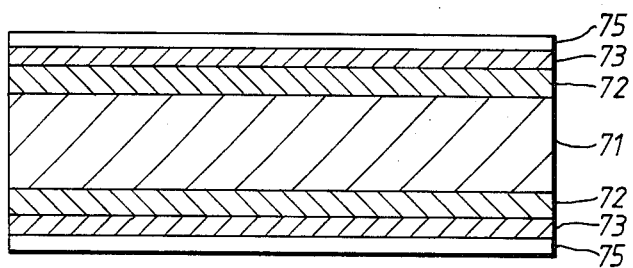
FIG. 7 illustrates a still further embodiment of the magnetic recording medium in accordance with the present invention.

FIG. 7 illustrates another embodiment in accordance with the present invention. In this embodiment, a Co-Cr system alloy film 72 is formed by vapor deposition as a magnetic recording medium on a nonmagnetic base 71. A silicon nitride film 73 is formed on top of it by, for example, magnetron sputtering, and a solid lubricant layer 75 is formed on top of all by sputtering. The silicon nitride film 73 is also made into a state of nitrogen deficiency by forming it by sputtering in an argon atmosphere in which the partial pressure of nitrogen is about 10% of the partial pressure of argon.

For double-sided disks, second layers of Co-Cr 72, silicon nitride 73 and lubricant 75 can be added to a second surface of base 71.

In a magnetic recording medium formed in this manner, an excellent durability similar to those of the preceding embodiments of the magnetic recording medium can also be obtained. Although in each of these embodiments a Co-Cr system alloy film was exemplified as a magnetic recording layer, it may be replaced by a Co-Cr alloy film or the like. This invention is particularly effective for a magnetic recording medium which has, as a magnetic recording layer, a metallic film that requires the formation of a lubricant layer on the surface. In addition, various selections may be made for the materials to be used for the base and the lubricant layer.

While the present invention has been described in connection with what is presently considered to be the most practical and preferred embodiments, it is to be understood that the present invention is not to be limited to the disclosed embodiments but on the contrary, is intended to cover various modifications and equivalent arrangements included within the spirit and scope of the appended claims whose scope is to be accorded the broadest interpretation so as to encompass all such modifications and equivalent structures.

What is claimed is:

1. A magnetic recording medium comprising:
   a substrate;
   at least one magnetic recording layer formed on a surface of the substrate, having an axis of easy magnetization in a direction essentially perpendicular to a surface of the layer thereof; and
   a silicon nitride film formed on the magnetic recording layer, the number of nitrogen atoms in the silicon nitride film being less than four thirds of the number of silicon atoms therein.

2. A magnetic recording medium according to claim 1, wherein the silicon nitride film has a composition of $Si_3N_{4-x}$, where x is more than zero and less than two.

3. A magnetic recording medium according to claim 1, further comprising a lubricant layer formed on the silicon nitride film.

4. A magnetic recording medium according to claim 3, wherein the lubricant layer comprises a fluorocarbon-containing lubricant.

5. A magnetic recording medium according to claim 1, wherein the magnetic recording layer comprises a metallic thin film.

6. A magnetic recording medium according to claim 5, wherein the magnetic recording layer is a Co-Cr containing alloy.

7. A magnetic recording medium according to claim 1, further comprising a second magnetic recording layer formed on a second surface of the substrate, and a second silicon nitride film formed on said second magnetic recording layer, the number of nitrogen atoms in the second silicon nitride layer being less than four thirds of the number of silicon atoms therein.

8. A magnetic recording medium for use with a magnetic recording system that records using a magnetic head, said medium comprising:
   a substrate;
   at least one magnetic recording layer formed of an alloy which as a Cr component overlying said substrate; and
   a silicon nitrde film formed as a top layer of said magnetic recording medium, and adapted to contact said magnetic head.

9. A medium as in claim 8 wherein said silicon nitride layer is formed directly on said magnetic recording layer.

10. A medium as in claim 9 wherein said alloy is an alloy of Co-Cr.

11. A medium according to claim 10 wherein the thickness of said silicon nitride film is between 20 Å and 500 Å.

12. A medium according to claim 10 wherein the thickness of said silicon nitride film is between 50 Å and 400 Å.

13. A medium as in claim 8 further comprising a ferromagnetic layer underlying said silicon nitride film and overlying said substrate and underlying said magnetic recording layer, against a bottom surface thereof.

14. A medium according to claim 10 further comprising a second magnetic recording layer formed on a second surface of said substrate, and a second silicon nitride film formed on said second magnetic recording layer.

15. A magnetic recording medium, comprising:
    a substrate;
    at least one magnetic recording layer of a Co-Cr containing alloy formed on a surface of the substrate, having a perpendicular magnetic anisotropy;
    a silicon nitrode film formed on the magnetic recording layer; and
    a lubricant layer formed directly on the silicon nitride film, said lubricant layer being a top layer of said magnetic recording medium adapted to contact a recording head.

16. A magnetic recording medium according to claim 15, wherein the lubricant layer comprises a fluorocarbon-containing lubricant.

17. A magnetic recording medium according to claim 15, wherein the thickness of the silicon nitrode film is between 150 Å and 250 Å, and the thickness of the lubricant layer is between 30 Å and 50 Å.

18. A magnetic recording medium according to claim 15, further comprising a second magnetic recording layer formed on a second surface of said substrate, a second silicon nitride layer formed on said second magnetic recording layer and a second lubricant layer formed on said second silicon nitride layer.

19. A medium according to claim 15 wherein said silicon nitride film is formed directly on the magnetic recording layer, 20. A medium according to claim 19 wherein the silicon nitride film and lubricant layer have thicknesses between 50 Å and 400 Å.

21. A magnetic recording medium, comprising:
    a substrate;
    a magnetic recording layer formed on a surface of the substrate, said magnetic recording layer being a Co-Cr containing alloy; and
    a silicon nitride film means, including a silicon nitride' film formed directly on said Co-Cr alloy as a top layer of said magnetic recording medium.

22. A medium as in claim 21 wherein said silicon nitride film means includes a lubricant layer on said silicon nitride film.

* * * * *